(12) United States Patent
Eriksson et al.

(10) Patent No.: US 11,923,994 B2
(45) Date of Patent: Mar. 5, 2024

(54) METHOD AND PACKET CORE SYSTEM FOR COMMON CHARGING OF NETWORK CONNECTIVITY AND CLOUD RESOURCE UTILIZATION

(71) Applicant: Telefonaktiebolaget LM Ericsson (publ), Stockholm (SE)

(72) Inventors: Hans Eriksson, Sollentuna (SE); Lars Westberg, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 205 days.

(21) Appl. No.: 17/753,051

(22) PCT Filed: Aug. 22, 2019

(86) PCT No.: PCT/SE2019/050770
§ 371 (c)(1),
(2) Date: Feb. 16, 2022

(87) PCT Pub. No.: WO2021/034241
PCT Pub. Date: Feb. 25, 2021

(65) Prior Publication Data
US 2022/0286308 A1  Sep. 8, 2022

(51) Int. Cl.
*H04L 12/14* (2006.01)
*H04L 61/4511* (2022.01)

(52) U.S. Cl.
CPC ...... *H04L 12/1407* (2013.01); *H04L 12/1421* (2013.01); *H04L 12/1435* (2013.01); *H04L 61/4511* (2022.05)

(58) Field of Classification Search
CPC ............. H04L 12/1407; H04L 12/1421; H04L 12/1435; H04L 61/4511; H04M 15/41;
(Continued)

(56) References Cited

U.S. PATENT DOCUMENTS 10,491,376 B1 * 11/2019 Suthar ................... H04L 63/102
10,813,002 B2 * 10/2020 Starsinic ........... H04M 15/8083
(Continued)

FOREIGN PATENT DOCUMENTS

EP  3153964 A1  4/2017
JP  2017135508 A  8/2017

OTHER PUBLICATIONS

International Search Report and Written Opinion for Application No. PCT/SE2019/050770, dated May 19, 2020, 15 pages.
(Continued)

*Primary Examiner* — Abdullahi Ahmed
(74) *Attorney, Agent, or Firm* — Nicholson De Vos Webster & Elliott LLP

(57) ABSTRACT

A user equipment (UE) a packet core system and method for common charging of network connectivity and cloud resource utilization for the UE. Upon receipt of a service request from the UE the packet core system sends a service definition of common network connectivity and cloud service classes. The UE sends a request for a network connectivity and cloud resource service with a common network connectivity and cloud service classes. The common class is translated into a first network connectivity class and a second cloud service class. A request for a cloud service comprising the second cloud service class is sent to a cloud node, and charging event is received from the cloud node. The charging event is merged with a charging event of network connectivity according to the first network connectivity class. A merged charging event, according to the requested common network connectivity and cloud service class, is achieved.

20 Claims, 8 Drawing Sheets

(58) Field of Classification Search
CPC ...... H04M 15/44; H04M 15/61; H04M 15/66; H04W 4/24
See application file for complete search history.

(56) References Cited

U.S. PATENT DOCUMENTS

| | | | |
|---|---|---|---|
| 2017/0102931 A1* | 4/2017 | Risbood | G06F 9/5072 |
| 2017/0201849 A1* | 7/2017 | Chandramouli | H04W 4/50 |
| 2019/0265957 A1* | 8/2019 | Risbood | G06F 9/44505 |
| 2019/0349269 A1* | 11/2019 | Li | H04M 15/785 |
| 2020/0177400 A1* | 6/2020 | Avasarala | H04M 15/73 |
| 2023/0142895 A1* | 5/2023 | Campbell | G06F 8/76 |
| | | | 717/140 |

OTHER PUBLICATIONS

3GPP TS 23.501 V15.2.0, "3rd Generation Partnership Project; Technical Specification Group Services and System Aspects; System Architecture for the 5G System; Stage 2 (Release 15)," Jun. 2018, 217 pages, 3GPP Organizational Partners.

3GPP TS 23.502 V15.2.0, "3rd Generation Partnership Project; Technical Specification Group Services and System Aspects; Procedures for the 5G System; Stage 2 (Release 15)," Jun. 2018, 308 pages, 3GPP Organizational Partners.

\* cited by examiner

METHOD AND PACKET CORE SYSTEM FOR COMMON CHARGING OF NETWORK CONNECTIVITY AND CLOUD RESOURCE UTILIZATION

CROSS-REFERENCE TO RELATED APPLICATIONS

This application is a National stage of International Application No. PCT/SE2019/050770, filed Aug. 22, 2019, which is hereby incorporated by reference.

TECHNICAL FIELD

This disclosure relates to charging of services used by a user equipment (UE). In more particular, it relates to common charging of network connectivity and cloud resource utilization, as consumed by the UE.

BACKGROUND

For quite some years "cloud computing" has continuously increased in the sense that users have reduced their investments in hardware and software, and instead leased computing resources in large data centers, which are accessed over the Internet.

While cloud computing offers increased flexibility and reduced costs, there are also real-time limitations due to physical distances, network congestion and transport protocols being used. These limitations have sparked an interest in geographically dispersed data centers, so called "distributed clouds".

An increase in distributed data centers and an increase in processing capacity open up for new devices being able to place some of their more computational intensive tasks as a work load in a nearby data center. Small devices, such as smart sensors/actuators, with minimum power and processing capabilities can thus benefit from placing a processing work load in a nearby data center, instead of performing the processing in the device itself.

Combination of cloud computing and cellular access is beneficial for several 5G use-cases, for example due to ultra-high availability demands, large data volumes and end-to-end application latency demands. It is also beneficial for the 5G network architecture wherein the cloud is moved closer to the end-user.

It is noted that the third generation partnership project (3GPP) architecture comprises an advanced control plane to control network resources, by use of quality of service (QoS) and policy control. This provides the operator a control of network resources and means to charge an end-user or third-party for resources, which the end-user is requesting.

The QoS-architecture is class-based, each class having a specific QCI-value. Class-based QoS-models can also be managed by a policy- and charging control function (PCRF) in 4G.

In 3GPP, a resource class definition uses a QoS definition called QoS class identifier (QCI) with different values, to control how resources are used and how to charge for the resources consumed.

However, it has been found that the introduction of operator-provided cloud infrastructure services does not consider an easy usage of network resources.

There is hence a need for a solution addressing one or more of the issues as discussed above.

SUMMARY

It is an object of exemplary embodiments to address at least some of the issues outlined above, and this object and others are achieved by a user equipment and a packet core system for common charging of network connectivity and cloud resource utilization, as well as method performed therein, according to the appended independent claims, and by exemplified embodiments, according to the dependent claims.

According to an aspect, this disclosure provides a method for enabling common charging of network connectivity and cloud resource utilization for a user equipment. The method is performed in the user equipment. The method comprises sending, to a packet core system, an attach request message. The method also comprises receiving, from the packet core system, one or more service definitions of common network connectivity and cloud service classes, as a consequence to said sending of the attach request message. Also, the method comprises sending, to the packet core system, a request for a network connectivity and cloud resource service, wherein the requested service is class-based, and wherein said request comprises one of said common network connectivity and cloud service classes. In addition, the method comprises receiving, from the packet core system, a response being an acceptance of the requested network connectivity and cloud resource service, enabling the packet core system to utilize common charging of network connectivity and cloud resource utilization.

According to another aspect, this disclosure provides a user equipment enabling common charging of network connectivity and cloud resource utilization of said user equipment. The user equipment is adapted to send, to a packet core system, an attach request message. The user equipment is also adapted to receive, from the packet core system, one or more service definitions of common network connectivity and cloud service classes, as a consequence to the sent attach request message. Also, the user equipment is adapted to send to the packet core system, a request for a network connectivity and cloud resource service, wherein the requested service is class-based, and wherein said request comprises one of said common network connectivity and cloud service classes. In addition, the user equipment is adapted to receive from the packet core system, a response being an acceptance of the requested common network connectivity and cloud resource service, enabling the packet core system to utilize common charging of network connectivity and cloud resource utilization.

According to yet another aspect, this disclosure provides a method for enabling common charging of network connectivity and cloud resource utilization for a user equipment. The method is performed in a packet core system that comprises a packet gateway. The method comprises receiving from the user equipment, an attach request message. The method also comprises sending to the user equipment, one or more service definitions of common network connectivity and cloud service classes, as a consequence to said receiving of the attach request message. In addition, the method further comprises the following steps being performed in the packet gateway. The method hence comprises receiving from the user equipment, a request for a network connectivity and cloud resource service, wherein the requested service is class-based, and wherein said request comprises one of said common network connectivity and cloud service classes. Also, the method comprises translating the common network connectivity and cloud service class of the requested service into a first network connectivity class and a second cloud service class. The method further comprises sending to a cloud node, a request for a cloud service, said request comprising the second cloud service class. The method comprises receiving from the cloud node, a charging event for cloud resources utilized according to the second cloud service class. Further, the method comprises merging the received charging event for cloud resources with a charging event of network connectivity according to the first network connectivity class, forming a merged charging event. In addition, the method comprises sending, to a charging node, the merged charging event for common charging of network connectivity and cloud resource utilization, according to the requested common network connectivity and cloud service class.

According to yet another aspect, this disclosure provides a packet core system that is capable of common charging of network connectivity and cloud resource utilization for a user equipment. The packet core system comprises a packet gateway. The packet core system is adapted to receive, from the user equipment, an attach request message. The packet core system is also adapted to send to the user equipment, one or more service definitions of common network connectivity and cloud service classes as a consequence to said receiving of the attach request message. The packet gateway of the packet core system is further adapted to receive from the user equipment, a request for a network connectivity and cloud resource service, wherein the requested service is class-based, and wherein said request comprises one of said common network connectivity and cloud service classes. Also, the packet gateway is adapted to translate the common network connectivity and cloud service class of the requested service into a first network connectivity class and a second cloud service class. Further, the packet gateway is adapted to send to a cloud node, a request for a cloud service, the request comprising the second cloud service class. Also, the packet gateway is adapted to receive from the cloud node, a charging event for cloud resources utilized according to the second cloud service class. The packet gateway is also adapted to merge the received charging event for cloud resources with a charging event of network connectivity according to the first network connectivity class, to form a merged charging event. In addition, the packet gateway is adapted to send to a charging node, the merged charging event for common charging of network connectivity and cloud resource utilization, according to the requested common network connectivity and cloud service class.

The present disclosure brings a number of advantages of at least some of the embodiments as disclosed herein:

The present disclosure provides an opportunity to flexibly change or update user equipment configurations of bearer setup parameters, based on what type of user equipment application service that is requested from the user equipment. The disclosure thus allows for a flexible change of bearer configurations so that requested connectivity in the mobile network fits requested end-user application services as provided by the operator in question.

It is further also an advantage that operators can offer common network access and cloud resource utilization services to its customers, with reduced cost for operation management of charging and billing.

BRIEF DESCRIPTION OF THE DRAWINGS

Embodiments will now be described in more detail, and with reference to the accompanying drawings, in which.

DETAILED DESCRIPTION

Figure 1:
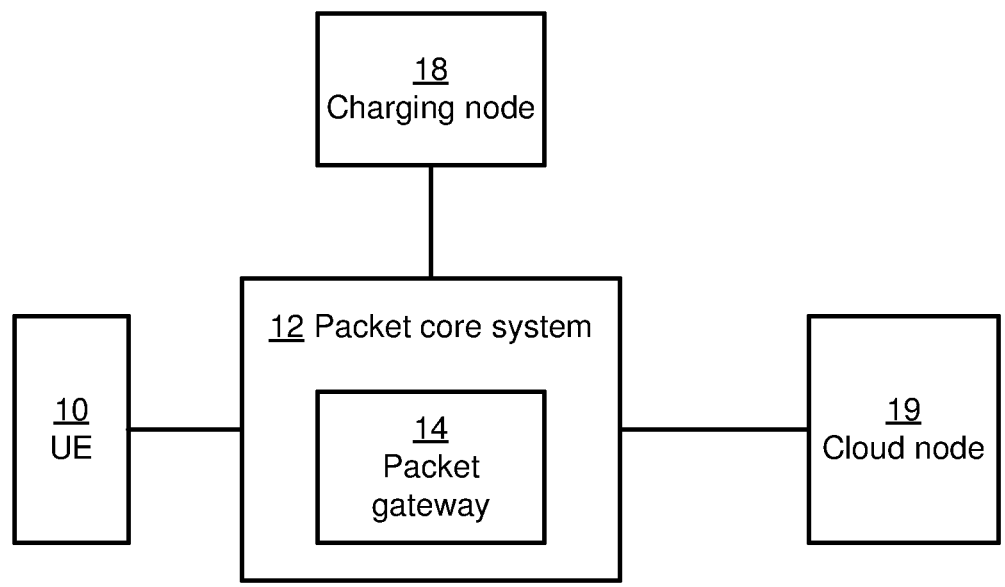
FIG. 1 schematically presents main entities of a communication system, related to the present disclosure.

In the following description, different embodiments of the exemplary embodiments will be described in more detail, with reference to accompanying drawings. For the purpose of explanation and not limitation, specific details are set forth, such as particular examples and techniques in order to provide a thorough understanding.

As mentioned above, combination of cloud computing and cellular access is beneficial for several 5G use-cases, for example due to ultra-high availability demands, large data volumes and end-to-end application latency demands. In these cases, where the cloud is moved closer to the end-user, integration of cloud services with network connectivity provides an opportunity to an operator to offer its customers flexible and easy usage of different cloud services.

The present disclosure provides a solution that allows for a common service request of network connectivity resources and cloud infrastructure resources, where the network connectivity resources and cloud infrastructure resources match each other. It also provides common charging reporting to reduce operator cost due to the management of fewer charging systems. The solution has the advantage that it is more optimized for operators, as the number of charging systems is reduced, and it is easier to use for end-users, as compared to earlier measures.

Herein, a class-based approach is applied to a combined request for network connectivity and cloud resources. By this approach, a request for cloud resources is integrated into the control plane such that a UE or client can request both network connectivity and cloud resource services by using a common request. The approach being class-based in the sense that, for instance, a quality of service (QoS) class indicator (QCI), may be used as a class definition for a common service that may be requested using the common request.

Using a definition for a common service, the operator in question can offer network connectivity as well as and cloud resource utilization service in combination.

As will be described further herein, network connectivity services and cloud resource utilization services can be combined into common class-based services for network connectivity and cloud resource utilization, where the network connectivity services and the cloud resource utilization services being combined are matched to each other. These common services are then offered to the customer via the UE.

In order to be able to request common network connectivity and cloud service class by a UE, the UE needs information about available service classes. For example the UE can be configured with information about which service classes are available for the UE. These service classes would define common resource classes to be used for network connectivity as well as cloud resource utilization. For example the service classes could comprise network access service class, defining QoS and bearer, and cloud resource service class, defining the number of CPUs and the amount of memory and disk, for processing.

One obvious way to provide such service class information to the UE would be to use a set of pre-configured static classes, which have been agreed upon. For example, for a specific cloud service the UE could use a specific request of bearer setup and QCI value. This request could possibly also comprise standardized values. However, standardized static values would limit the flexibility for the operator to use tailor-made competitive class definitions, which can change over time.

The present disclosure therefore also provides how to download service classes to the UE for a specific cloud service that is bundled with a matching network connectivity service. This provides a solution in which the service classes, which can be downloaded in the UE are based on the type of service request that can be sent from the U E.

It is noted that the common network connectivity and cloud resource classes, as herein described, may thus use novel QCI values as common class identifiers, to define a common class-based resource request for network connectivity and cloud resource utilization. This common class-based resource request may then be used during a user's session when being connected to operator-provided services.

This is an advantage since until now, no determination has been made in order to find out whether a network connectivity service matches a cloud resource utilization service. Moreover, since separate services have until now been handled separately, no common charging reporting for consumed network connectivity and cloud resources, has been demonstrated until now. The present solution provides a complete end-to-end service to customers.

As will be further described herein, integration of cloud services with network connectivity services provides an opportunity to an operator to offer its customers flexible and easy usage of different cloud services which match mobile access subscription of a UE in question. The present disclosure enables the UE to send a request message, to a server in the operator's network, wherein the request message comprises information about a cloud service specification. In response to the request, the server sends a response message with common class-based configuration parameters for bearer setup and a reference, such a fully qualified domain name (FQDN), Uniform resource identifier (URI) or IP address, of a cloud infrastructure service being requested.

With reference to the figures in the drawings, a more detailed description of the present disclose will now be presented.

FIG. 1 schematically presents main entities of a communication system, related to embodiments of the present disclosure. FIG. 1 comprises a user equipment (U E) 10, a packet core system 12, a cloud node 19, and a charging node 18. The packet core system 12 also comprises a packet gateway 14.

Figure 2:
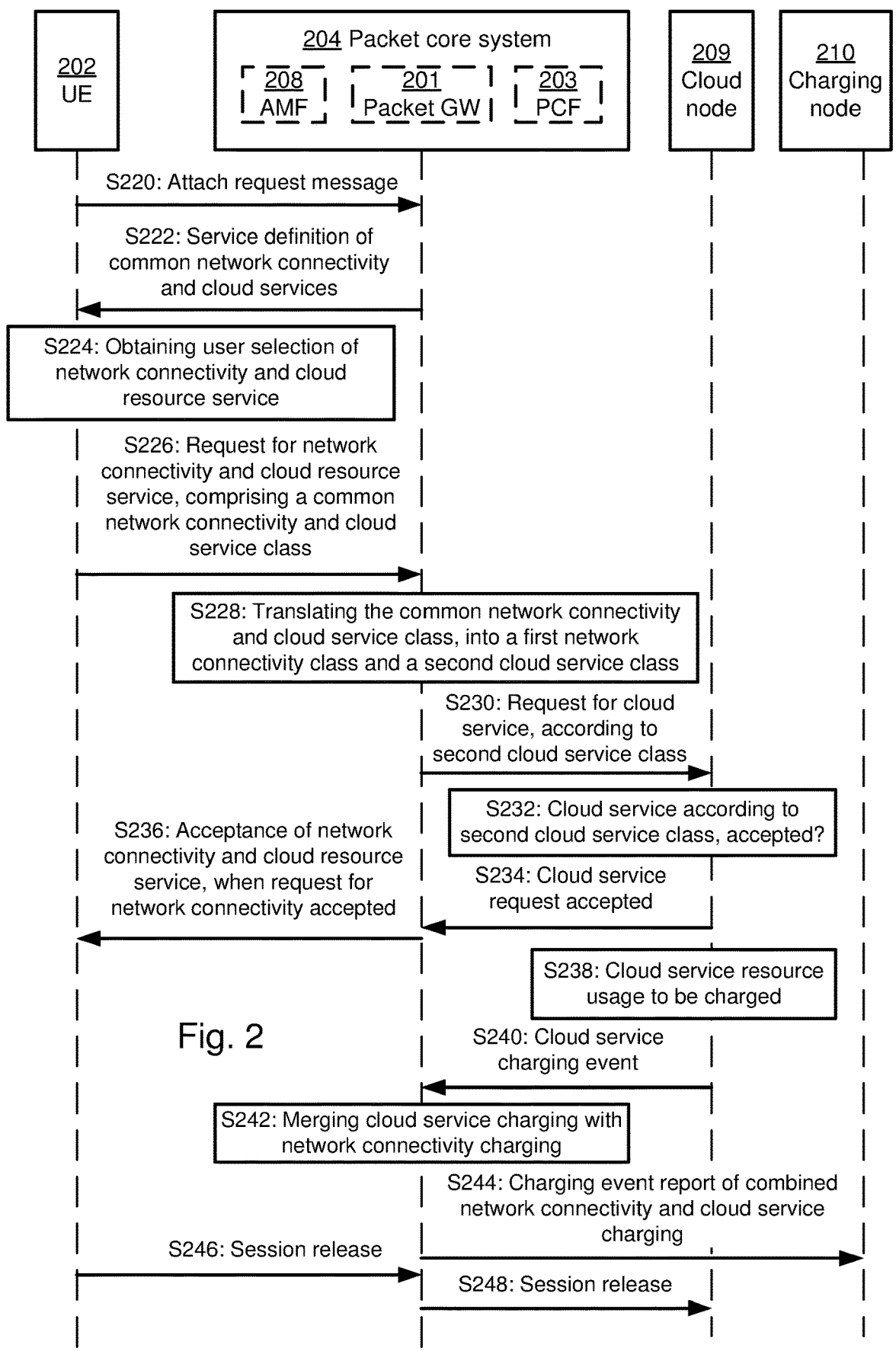
FIGS. 2 to 4 illustrate handshake diagrams of actions between entities of the communication system, according to embodiments of the present disclosure.

FIG. 2 schematically presents a hand-shake diagram of actions for enabling common charging of network connectivity and cloud resource utilization for a UE. The actions in the handshake diagram are between entities of the communication system. The communication system comprises a UE 202 and a packet core system 204. The packet core system 204 comprises a packet gateway (GW) 201, a policy and charging function (PCF) 203, and an access management function (AMF) 208. The communication system also comprises a cloud node 209 and a charging node 210.

Action S220: Initially, the UE 202 sends an attach request message to the packet core system 204. This request may be sent from the UE 202 to the AMF 208 of the packet core system 204. This attach request message may be responded to, by an attachment reply message from the packet core system to the U E.

Action S222: The packet core system 204 sends one or more service definitions of common network connectivity and cloud services classes to the UE. Said one or more service definitions of common network connectivity and cloud service classes, may comprise service descriptors of each one of said common network connectivity and cloud service classes. The service descriptors of each one of said common network connectivity and cloud service classes, may represent unique combinations of resource parameters for network connectivity bandwidth and cloud service computing capacity. The packet core system 204 may send said one or more service definitions in a hyper-text transfer protocol security (HTTPS) request response from an Authorization server within the packet core system, or in a domain name server (DNS) reply from a DNS server, of the packet core system.

The handshake diagram may further comprise configuring the UE with said one or more service definitions of common network connectivity and cloud service classes, as sent by the packet core system.

Action S224: Obtaining by the UE 202 user selection of network connectivity and cloud resource service, from the packet core system 204.

Action S226: Sending, by the UE 202, a request for network connectivity and cloud resource service, comprising a common network connectivity and cloud service class, to the packet core system 204. The requested service is class-based, and the request comprises one of said common network connectivity and cloud service classes.

Action S228: Translating, by the packet core system 204, the common network connectivity and cloud service class, into a first network connectivity class and a second cloud service class.

Action S230: Sending, by the packet core system 204, a request for cloud service, according to the second cloud service class, to the cloud node 209.

Action S232: Determining, by the cloud node 209, whether the cloud service according to the second cloud service class is accepted, or not.

Action S234: Sending, by the cloud node 209, a cloud service accepted, to the packet core system 204, when the second cloud service class can be met by the cloud node 209.

Action S236: Sending, by the packet core system 204, a response being an acceptance of the requested network connectivity and cloud resource service, to the UE 202, when the request for network connectivity is accepted.

Action S238: Identifying, by the cloud node 209, cloud service resource usage to be charged.

Action S240: Sending, by the cloud node 209, a cloud service charging event, to the packet core system 204.

Action S242: Merging, by the packet core system 204, cloud service charging with network connectivity charging.

Action S244: Sending, by the packet core system 204, charging event report of combined network connectivity and cloud service charging, to the charging node 210.

Action S246: Sending, by the UE 202, a session release, to the packet core system 204.

Action S248: Sending, by packet core system 204, a session release, to the cloud node 209.

Figure 3:
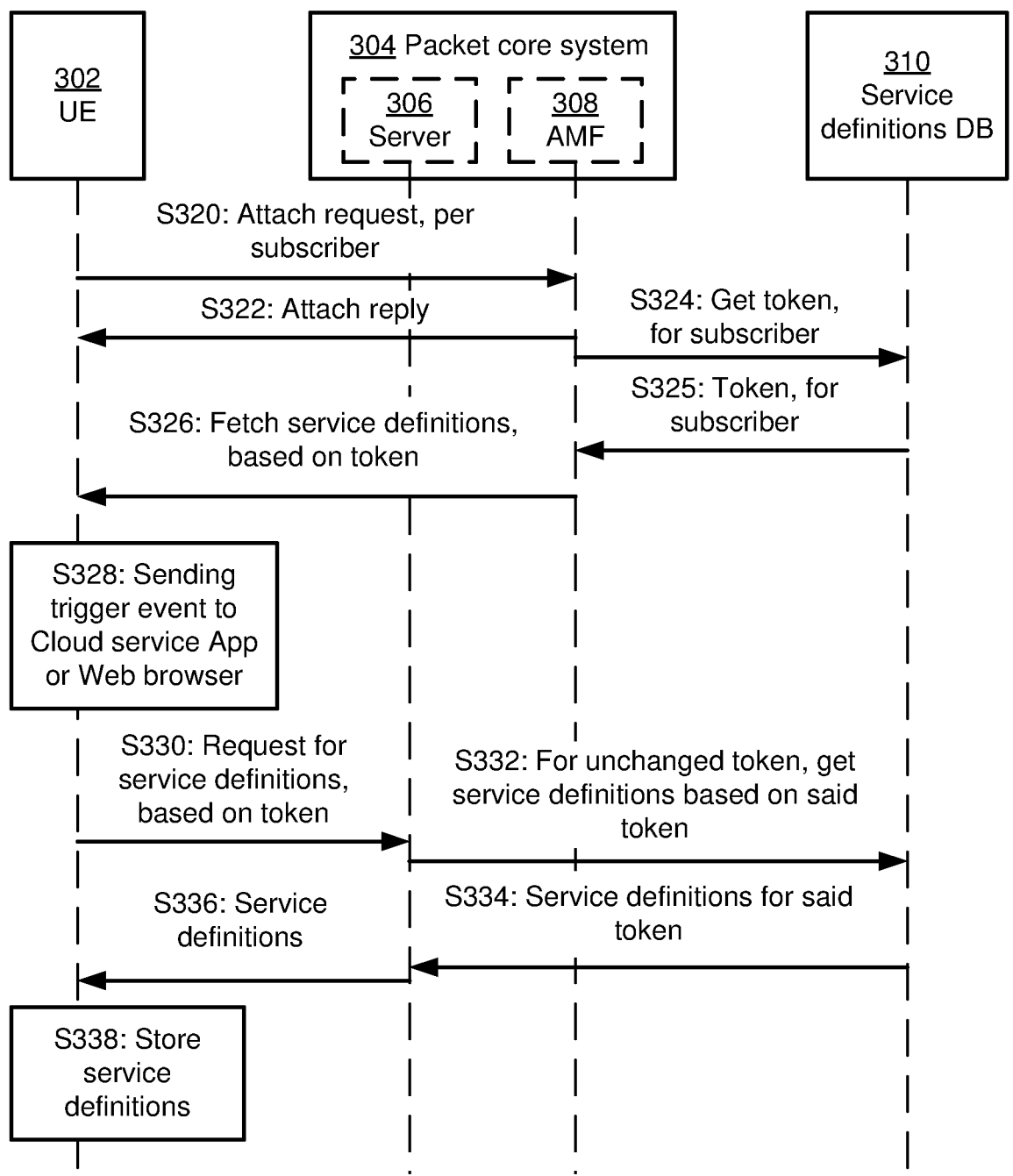

FIG. 3 schematically presents a hand-shake diagram of actions for enabling common charging of network connectivity and cloud resource utilization for a UE. The actions in the handshake diagram are between entities of the communication system. The communication system comprises a UE 302, a packet core system 304 and a service definitions database (DB) 310. The packet core system 304 comprises a sever 306 and an access management function (AMF) 308.

Actions of the handshake diagram of FIG. 3, may be considered to correspond to actions S220 and S222, however in somewhat more detail.

The actions as presented in FIG. 3 serve the purpose to provide to the UE a selection of service definitions, from which the UE in question may choose from, when sending the request for network connectivity and cloud resource service in action S226, as presented in FIG. 2.

The actions of FIG. 3 comprise:

S320: Sending, by the UE 302, an attach request message, to the AMF 308 of the packet core system 304. The attach request message may be per subscriber.

S322: Sending, by the AMF 308, an attach reply to the UE 302.

S324: Sending, by the AMF 308, a "GET" instruction to the service definitions DB 310, wherein the GET instruction also comprises subscriber information for the subscriber in question.

The token gives a reference to a description of service definitions, which will be available for the UE 302 to choose from, for a subscription.

The description describes service definitions of network connectivity and cloud resource service offerings, which may be provided by an operator. This network connectivity and cloud resource service may be considered to be bundled together, and form a bundled service as provided by an operator.

The service definitions being offered may comprise a service-identifier (ID), quality of service (QoS) class identifier (QCI) values, and reference to a function that may provide the information e.g. fully qualified domain server (FQDN) or Internet protocol (IP) address.

The token may also be stored in the AMF 308, awaiting a service request in action S330.

S326: Sending, by the AMF 308, a notification to "fetch" service definitions by the UE 302, based on the token, where said notification is sent to the UE 302. This notification may be regarded as a trigger and may be sent as a short message service (SMS) or similar message. This message may comprise the token and a reference to the server 306. This server 306 may be either an authentication server or a domain name server (DNS). The token may be encrypted, for instance by using a key that may have been used in the authentication sequence. This key may also be stored in a universal subscriber identity module (USIM) of the UE 302, or an alternative pre-shared key may be used.

S328: Sending, by the UE 302, a trigger event to a dedicated cloud service application (APP) or to a Web browser. In this scenario, the operator may provide the dedicated APP or the Web browser within the UE 302, to the users which have subscribed to the bundled network connectivity and cloud resource services.

S330: Sending, by the UE 302, a request for service definitions to the server 306, based on the token. This request may be sent as a hyper-text transfer protocol (HTTP) "GET" command to the server 306, where the server is an authorization server.

Alternatively, this request may be sent as a domain name server (DNS) request to a DNS server, being one example of the server 306. The request is sent to the server 306 to fetch the service definitions for the bundled service. The service definitions may comprise bundled service QCI value and FQDN or IP address to the requested bundled service.

It is noted that a request for service definitions is sent for each token, in the case there are several tokens available.

The server 306 may now perform a control of whether the provided token, as provided in the request in action S330, corresponds to the token for the subscriber in question as obtained from the service definitions database in action S324.

This control is intended to pick up any changed or mistaken tokens, and/or attempts to obtain service definitions from another subscriber.

S332: If the server 306 determines that the two tokens are the same, service definitions are obtained from the service definitions DB 310 by sending a "GET" command therefore.

S334: As a consequence to the "GET" command in action S332, the service definitions DB 310 thus sends the service definitions, based on the token for the subscriber in question to the server 306.

S336: Forwarding, by the server 306, a response to the request in S330, said response comprising said service definitions, to the UE 302. Within the UE 302, the APP for the service or the Web browser used receives the service definitions. The service definitions may include a QCI value for the bundled server as requested, and a reference to the server 306, or the cloud service, as in the form of an IP address or a FQDN. The token control may be considered to be an authorization control. Forwarding the service definitions to the UE 302 is only performed if the server 306 grants authorization for the UE 302, i.e. when the two tokens are the same.

S338: Having received the service definitions in action S336, the UE 302 may now store the service definitions in action S338.

In the case of the server 306 being a DNS server, the request as sent in action S330 comprises a domain name as reference, in order to obtain the service definitions, in form of a QCI value, as part of a DNS reply as the response in action S336. An example of a domain name may be in the form of App-ID.operator.com.

The service definitions DB 10 may be a unified data management (UDM) or user data repository (UDR).

In the case of the server 306 being an authorization server, the request in actions S330 and the response in action S336 may be part of a hyper-text transfer protocol secure (HTTPS) session.

Figure 4:
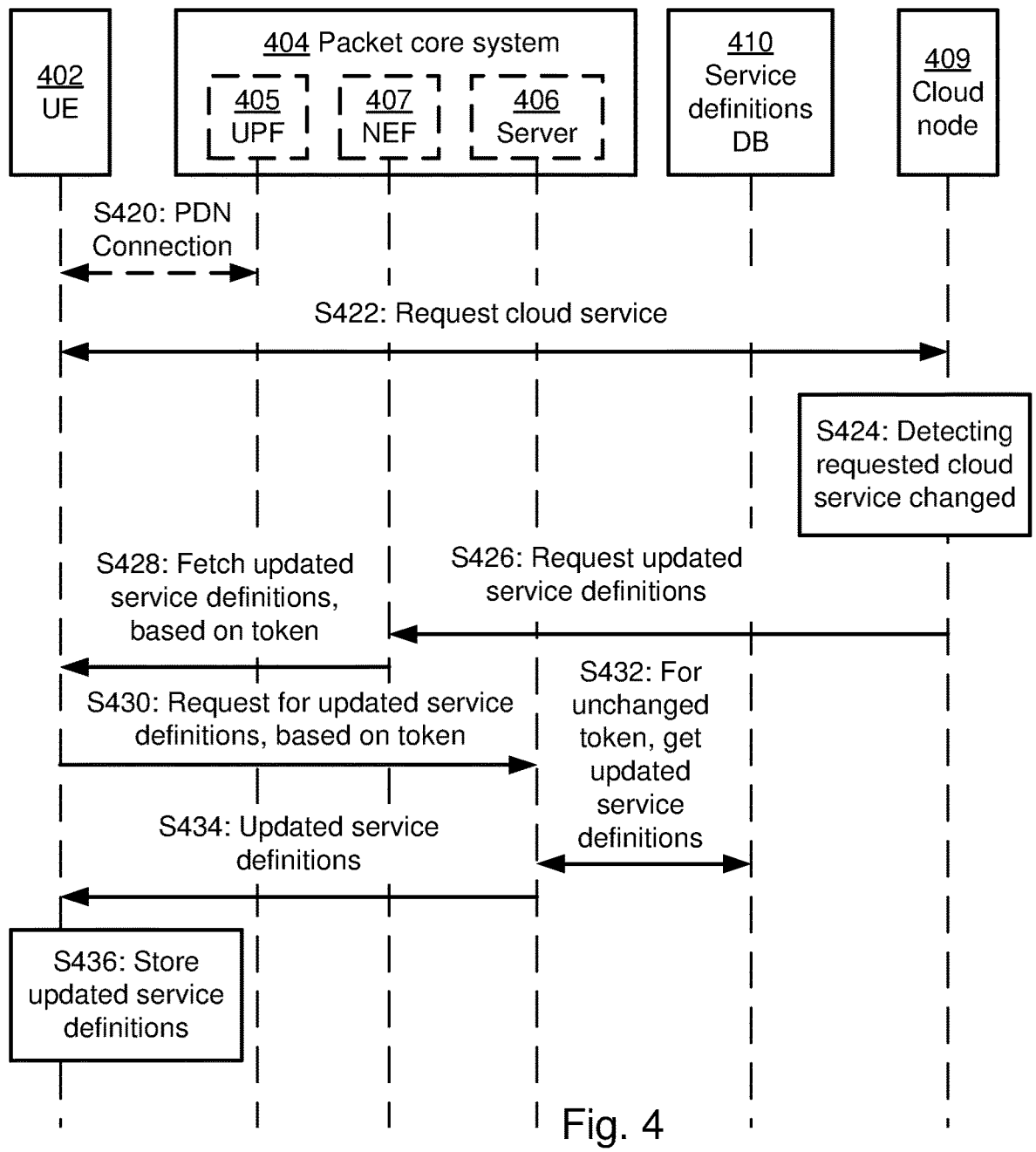

FIG. 4 schematically presents a hand-shake diagram of actions for enabling common charging of network connectivity and cloud resource utilization for a UE. The actions in the handshake diagram are between entities of the communication system. The communication system comprises a UE 402, a packet core system 404, a service definitions database (DB) 410, and a cloud node 409. The packet core system 404 comprises a user plane function (UPF) 405, a server 406 and a network exposure function (NEF) 407.

This handshake diagram presents a sequence in the case when an update of service definitions is required. The UE 402 typically needs to complete an attach sequence, such that a connectivity is established between the UE and a packet core network. The cloud node 409 detects that a requested service cannot be fulfilled or that the service has been changed. In this case, the cloud node 409 may request the UE 402 to update the service definitions.

The handshake diagram as presented in FIG. 4 describes how an update of service parameters may be performed.

Action S420: Establishing a radio bearer and a packet data network (PDN) connection, between the UE 402 and the UPF 405 of the packet core system 404. This action is performed after a UE attach and a service request for packet data network (PDN) connection, are performed. Thus a radio bearer and a PDN connection are established which provides the UE with a IP connection to packet data networks (PDNs).

Action S422: Sending, by the UE 402, a request for a new cloud service, to the cloud node 409. This request is sent from the UE App or a Web client within the UE 402.

Action S424: Detecting, by the cloud node 409, that the requested cloud service has changed, or that it is not provided any longer.

Action S426: Sending, by the cloud node 409, a request for updated service definitions, to the network exposure function (NEF) 407. This request may be an application trigger request to inform the UE hat service definitions must be updated. In the case the service definitions are changed in the mobile network domain, for instance in a DB for service definitions, a trigger event may be sent from the DB to either the authorization server or DNS sever, being embodiments of the server 406. This server 406, i.e. either the authorization server or the DNS, may then forward the application trigger to the NEF 407, as a request to the NEF 407 to send application trigger information to the UE 402.

Action S428: The NEF 407 sends a notification to fetch updated service definitions based on token, to the UE 402. This notification may be sent via SMS or a similar message. This notification may comprise an application reference /ID and the token, as well as information that the service definitions must preferably be updated.

Action S428: The UE 402, sending a request for updated service definitions, based on token, to the server 406. This action is very similar to action S330, as described in connection to the presentation of FIG. 3. In the case of the server 406 being an authorization server, a HTTPS session may be established between the UE and the authorization server and the request may be a "GET" command to fetch service definitions, for example as bundled QCI value and a reference to cloud services. Also other service descriptors may be envisaged herein.

In the case the server 406 is a DNS server, the request may be a DNS—request with for instance a reference App-ID.operator.com.

Action S430: The server 406 in question performs a check to certify that the subscription and token are valid, and sends a "GET" command to the service definitions DB 410 for the subscriber using the token. If the token as received in the request sent in action S428, is the same as the token for the same subscriber, updated service definitions are obtained in action S430 from the service definitions DB 410. Thus, for unchanged token, server 406 gets updated service definitions, from service definitions DB 410.

Action S434: Sending by the server 406, the updated service definitions, to the UE 402. As explained earlier it may be the UE App or the web browser used in the UE for the service, which receives the service definitions, here updated. The service definitions may be in the form of a QCI value for the bundled network connectivity and cloud resource service with either the FQDN or IP address of the cloud service. This action S434 of sending updated service definitions is performed if the authorization of the subscriber with the token for the service definitions is granted.

Action S436: Storing, by the UE 402, the updated service definitions. The updated service definitions may then be used by the UE App to send a new service request for a bundled service, corresponding to action S226 as presented in FIG. 2.

The storing of the updated service definitions in the UE, as performed in action S436, may differ from the storing of the service definitions in the UE, as performed in action S338, in the way that a possible second bearer is setup for the requested bundled service. Alternatively, the already established bearer may be closed and a new bearer and packet data network (PDN) connection is established.

Figure 5:
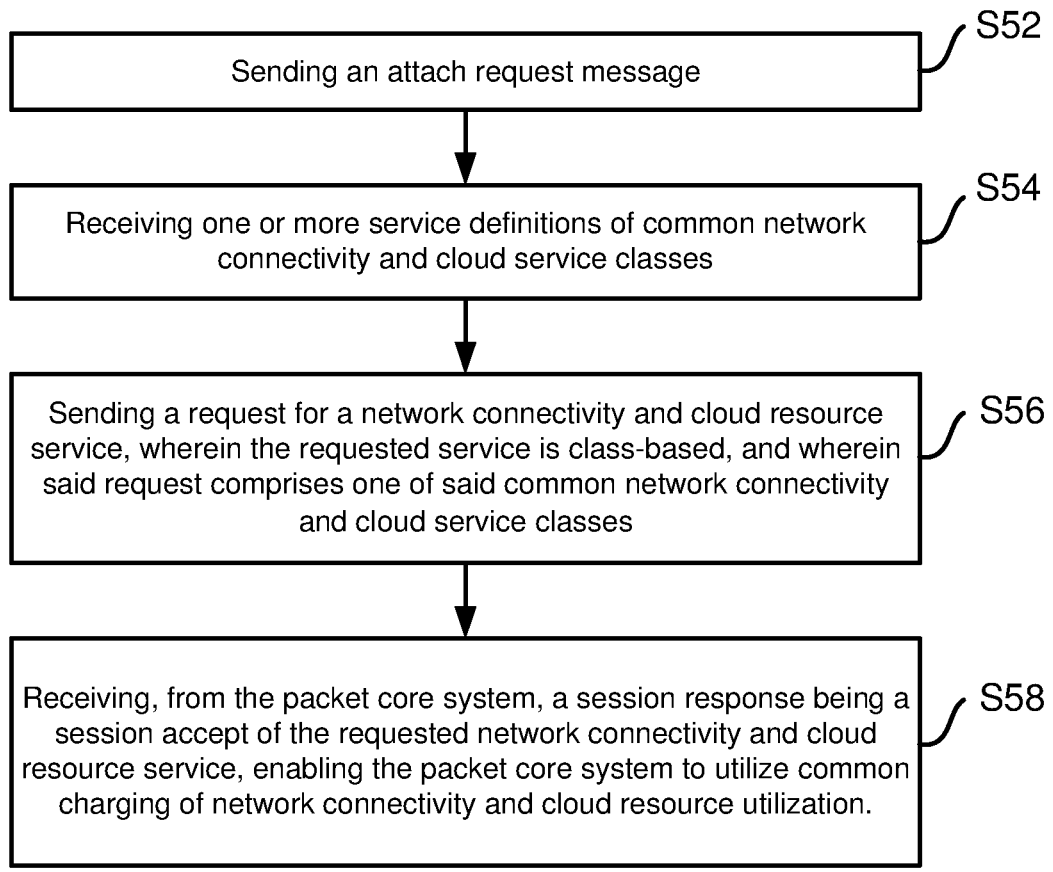
FIG. 5 illustrates a flowchart of a method, according to an aspect of the present disclosure.

FIG. 5 presents a flowchart of a method according to an aspect of the present disclosure. This flowchart comprises actions of a method for enabling common charging of network connectivity and cloud resource utilization for a UE. The method is performed in the UE. The method comprises:

Sending S52, S220, S320 an attach request message, to a packet core system. The method also comprises:

Receiving S54, S222, S336, S434, from the packet core system, one or more service definitions of common network connectivity and cloud service classes, as a consequence to said sending S52 of the attach request message. Further, the method comprises:

Sending S56, S226, to the packet core system, a request for a network connectivity and cloud resource service, wherein the requested service is class-based, and wherein said request comprises one of said common network connectivity and cloud service classes. In addition, the method comprises:

Receiving S58, S236, from the packet core system, a response or session response being an acceptance or session accept of the requested network connectivity and cloud resource service. This enables the packet core system to utilize common charging of network connectivity and cloud resource utilization.

In one embodiment, receiving S54, S222, S336, S434 of said one or more service definitions may comprise receiving service descriptors of each one of said common network connectivity and cloud service classes. The service descriptors of each one of said common network connectivity and cloud service classes, may represent unique combinations of resource parameters for network connectivity bandwidth and cloud service computing capacity.

In one embodiment, receiving S54, S222, S336, S434 said one or more service definitions may comprise receiving said one or more service definitions in a hyper-text transfer protocol security (HTTPS) request response from an authorization server, or in a domain name server (DNS) reply from a DNS server.

The method may further optionally comprise configuring the UE with the received one or more service definitions of common network connectivity and cloud service classes.

Figure 6:
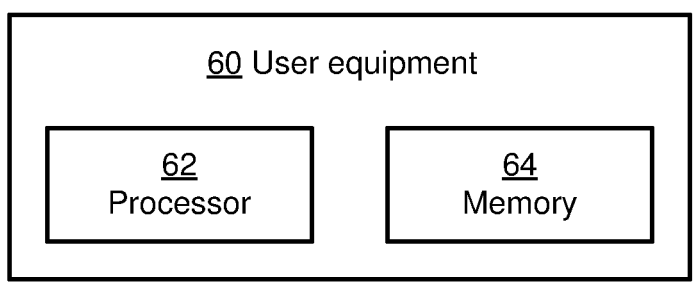
FIG. 6 schematically presents a user equipment, according to another aspect of the present disclosure.

FIG. 6 schematically presents a user equipment (UE) 10, 60, 202, 302, 402, 1102, according to another aspect of the present disclosure.

The present disclosure also comprises a user equipment (UE) 10, 60, 202, 302, 402, 1102 enabling common charging of network connectivity and cloud resource utilization of said UE. The UE is adapted to send, to a packet core system 12, 80, 204, 304, 404, 1104 an attach request message. The UE is also adapted to receive, from the packet core system, one or more service definitions of common network connectivity and cloud service classes, as a consequence to the sent attach request message. The UE is further adapted to send to the packet core system, a request for a network connectivity and cloud resource service, wherein the requested service is class-based, and wherein said request comprises one of said common network connectivity and cloud service classes. In addition, the UE is adapted to receive from the packet core system, a response being an acceptance of the requested common network connectivity and cloud resource service, enabling the packet core system to utilize common charging of network connectivity and cloud resource utilization.

The UE 10, 60, 202, 302, 402, 1102 may further be adapted to receive service descriptors of each one of said common network connectivity and cloud service classes. The service descriptors of each one of said common network connectivity and cloud service classes, may represent unique combinations of resource parameters for network connectivity bandwidth and cloud service computing capacity.

The UE 10, 60, 202, 302, 402, 1102 may also be adapted to receive said one or more service definitions, from a server 306, 406 in a hyper-text transfer protocol security (HTTPS) request response or in a domain name server (DNS) reply.

The UE 10, 60, 202, 302, 402, 1102 may in addition be configured with the received one or more service definitions of common network connectivity and cloud service classes.

The present disclosure also comprises a user equipment (UE) 10, 60, 202, 302, 402, 1102 enabling common charging of network connectivity and cloud resource utilization of said UE. The UE comprises a processor 62 and a memory 64 having instructions executable by the processor 62, wherein said processor 62 when executing said instructions is configured to send, to a packet core system 12, 80, 204, 304, 404, 1104, an attach request message. The processor 62 when executing said instructions is further configured to receive, from the packet core system, one or more service definitions of common network connectivity and cloud service classes, as a consequence to the sent attach request message. Also, the processor 62 when executing said instructions is further configured to send to the packet core system, a request for a network connectivity and cloud resource service, wherein the requested service is class-based, and wherein said request comprises one of said common network connectivity and cloud service classes. In addition, the processor 62 when executing said instructions is further configured to receive from the packet core system, a response being an acceptance of the requested common network connectivity and cloud resource service, enabling the packet core system to utilize common charging of network connectivity and cloud resource utilization.

Figure 7:
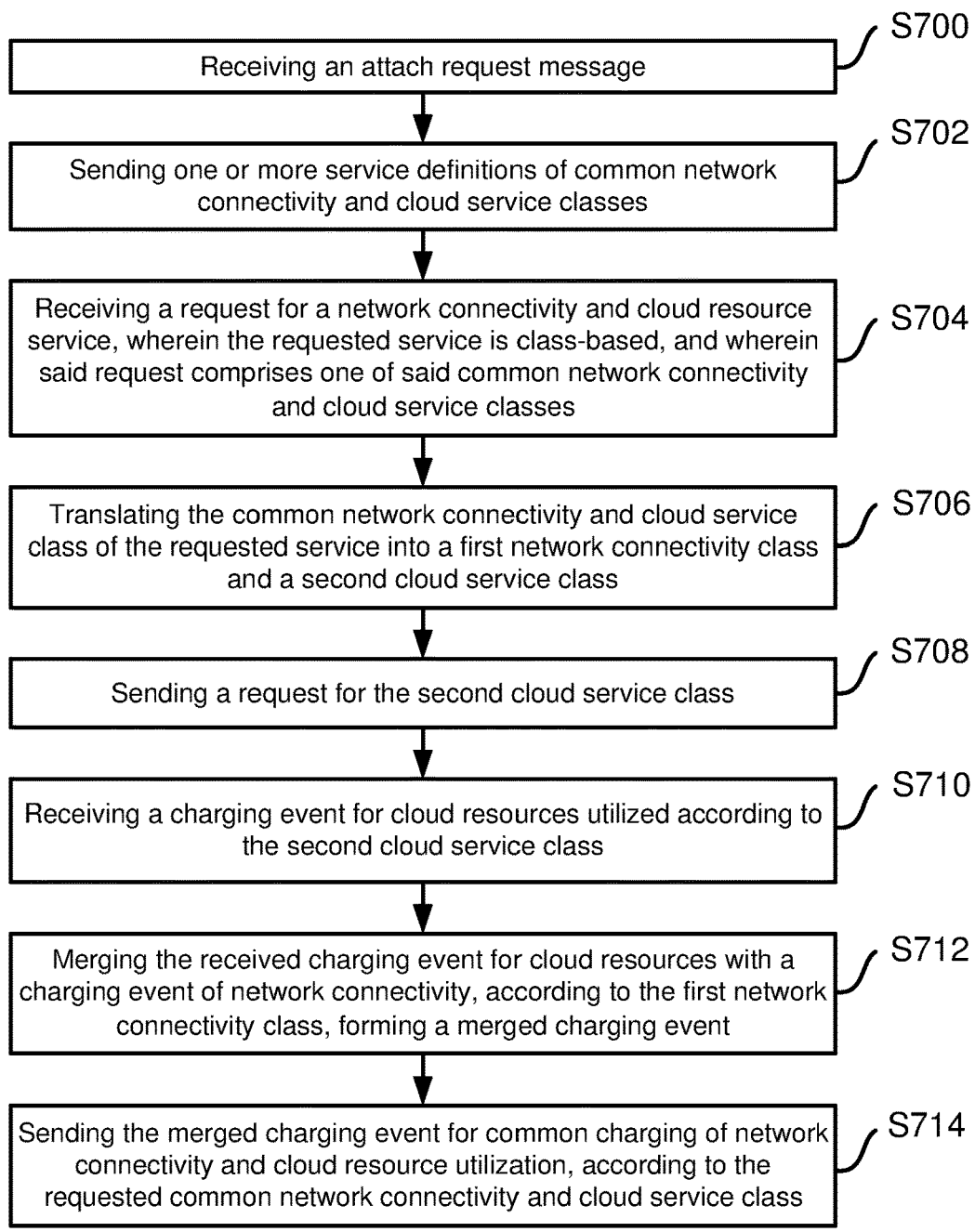
FIG. 7 illustrates a flowchart of a method according to yet another aspect of the present disclosure.

FIG. 7 presents a flowchart of a method according to an aspect of the present disclosure. This flowchart comprises actions of a method for enabling common charging of network connectivity and cloud resource utilization for a UE. The method is performed in a packet core system 12, 80, 204, 304, 404 comprising a packet gateway 14, 82. The method comprises receiving S220, S320, S700 from the UE, an attach request message. The method also comprises sending S222, S336, S434, S702 to the UE, one or more service definitions of common network connectivity and cloud service classes, as a consequence to said receiving of the attach request message. In addition, the method further comprises the following steps being performed in the packet gateway 14, 82. The method comprises receiving S226, S704 from the UE, a request for a network connectivity and cloud resource service, wherein the requested service is class-based, and wherein said request comprises one of said common network connectivity and cloud service classes. Also, the method comprises translating S228, S706 the common network connectivity and cloud service class of the requested service into a first network connectivity class and a second cloud service class. The method further comprises sending S230, S708 to a cloud node, a request for a cloud service, said request comprising the second cloud service class. The method comprises receiving S240, S710 from the cloud node, a charging event for cloud resources utilized according to the second cloud service class. Further, the method comprises merging S242, S712 the received charging event for cloud resources with a charging event of network connectivity according to the first network connectivity class, forming a merged charging event. In addition, the method comprises sending S244, S714, to a charging node, the merged charging event for common charging of network connectivity and cloud resource utilization, according to the requested common network connectivity and cloud service class.

Sending S222, S336, S434, S702 of said one or more service definitions, may comprise sending, to the UE, service descriptors of each one of said common network connectivity and cloud service classes.

The service descriptors of each one of said common network connectivity and cloud service classes, may represent unique combinations of resource parameters for network connectivity bandwidth and cloud service computing capacity.

The method may further comprise receiving, from the cloud node, a response to said request for the cloud service, wherein said response comprises an acceptance S234 of said request, and wherein receiving S240, S710, the charging event may comprise receiving a charging event for cloud resources according to the accepted second cloud service class.

Sending S222, S336, S434, S702, to the UE, said one or more service definitions may comprise sending said one or more service definitions in a HTTPS request response, or in a DNS reply.

The method may further comprise receiving an acceptance of the requested network connectivity according to the first network connectivity class, from the cloud node.

Figure 8:
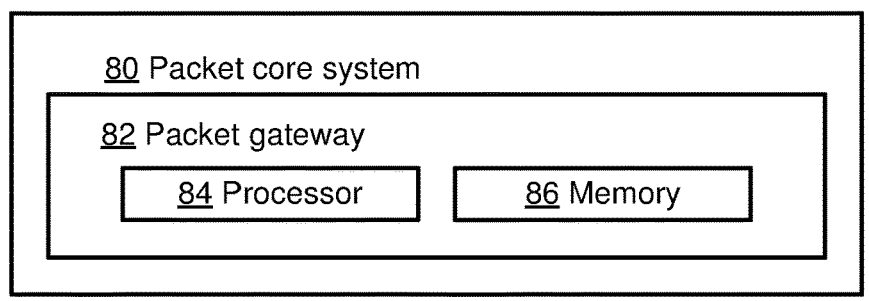
FIG. 8 schematically presents a packet core system, according to yet another aspect of the present disclosure.

FIG. 8 schematically presents a packet core system 12, 80, 204, 304, 404, 1104 capable of common charging of network connectivity and cloud resource utilization for a UE 10, 60, 202, 302, 402, 1102. The packet core system comprises a packet gateway 14, 82. The packet gateway comprises a processor 84 and a memory 86.

The packet core system 12, 80, 204, 304, 404, 1104 is adapted to receive, from the UE, an attach request message, and to send to the UE, one or more service definitions of common network connectivity and cloud service classes as a consequence to said receiving of the attach request message.

The memory 86 of the packet gateway 14, 82 has instructions executable by the processor 84, wherein said processor 84 when executing said instructions is configured to receive, from the UE, an attach request message. The processor 84 when executing said instructions is configured to send to the UE, one or more service definitions of common network connectivity and cloud service classes as a consequence to said receiving of the attach request message. Also, the processor 84 when executing said instructions is configured to send to receive from the UE, a request for a network connectivity and cloud resource service, wherein the requested service is class-based, and wherein said request comprises one of said common network connectivity and cloud service classes. The processor 84 when executing said instructions is also configured to translate the common network connectivity and cloud service class of the requested service into a first network connectivity class and a second cloud service class. The processor 84 when executing said instructions is also configured to send to a cloud node 19, 209, 409, a request for a cloud service, the request comprising the second cloud service class. Moreover, the processor 84 when executing said instructions is configured to receive from the cloud node 19, 209, 409, a charging event for cloud resources utilized according to the second cloud service class. The processor 84, when executing said instructions, is also configured to merge the received charging event for cloud resources with a charging event of network connectivity according to the first network connectivity class, to form a merged charging event. In addition, the processor 84 when executing said instructions is configured to send to a charging node 18, the merged charging event for common charging of network connectivity and cloud resource utilization, according to the requested common network connectivity and cloud service class.

The present disclosure also comprises a packet core system 12, 80, 204, 304, 404, 1104 capable of common charging of network connectivity and cloud resource utilization for a UE 10, 60, 202, 302, 402, 1102. The packet core system comprises a packet gateway 14, 82. The packet core system 12, 80, 204, 304, 404, 1104 is adapted to receive, from the UE, an attach request message. The packet core system is also adapted to send to the UE, one or more service definitions of common network connectivity and cloud service classes as a consequence to said receiving of the attach request message. The packet gateway of the packet core system is further adapted to receive from the UE, a request for a network connectivity and cloud resource service, wherein the requested service is class-based, and wherein said request comprises one of said common network connectivity and cloud service classes. Also, the packet gateway is adapted to translate the common network connectivity and cloud service class of the requested service into a first network connectivity class and a second cloud service class. Further, the packet gateway is adapted to send to a cloud node 19, 209, 409, a request for a cloud service, the request comprising the second cloud service class. Also, the packet gateway is adapted to receive from the cloud node 19, 209, 409, a charging event for cloud resources utilized according to the second cloud service class. The packet gateway is also adapted to merge the received charging event for cloud resources with a charging event of network connectivity according to the first network connectivity class, to form a merged charging event. In addition, the packet gateway is adapted to send to a charging node 18, the merged charging event for common charging of network connectivity and cloud resource utilization, according to the requested common network connectivity and cloud service class.

The packet core system 12, 80, 204, 304, 404, 1104 may further be adapted to send, to the UE 10, 60, 202, 302, 402, 1102, service descriptors of each one of said common network connectivity and cloud service classes.

The service descriptors of each one of said common network connectivity and cloud service classes, may represent unique combinations of resource parameters for network connectivity bandwidth and cloud service computing capacity.

The packet gateway 14, 82 of the packet core system may further be adapted to receive, from the cloud node 19, 209, 409, a response to said request for the second cloud service class, wherein said response comprises an acceptance of said request, and may further be adapted to receive a charging event for cloud resources according to the accepted second cloud service class.

The packet gateway 14, 82 of the packet core system may further be adapted to send, from a server, said one or more service definitions in a HTTPS request response, or in a DNS reply.

In addition, the packet gateway 14, 82 of the packet core system may further be adapted to receive an acceptance of the requested network connectivity according to the first network connectivity class.

Figure 9:
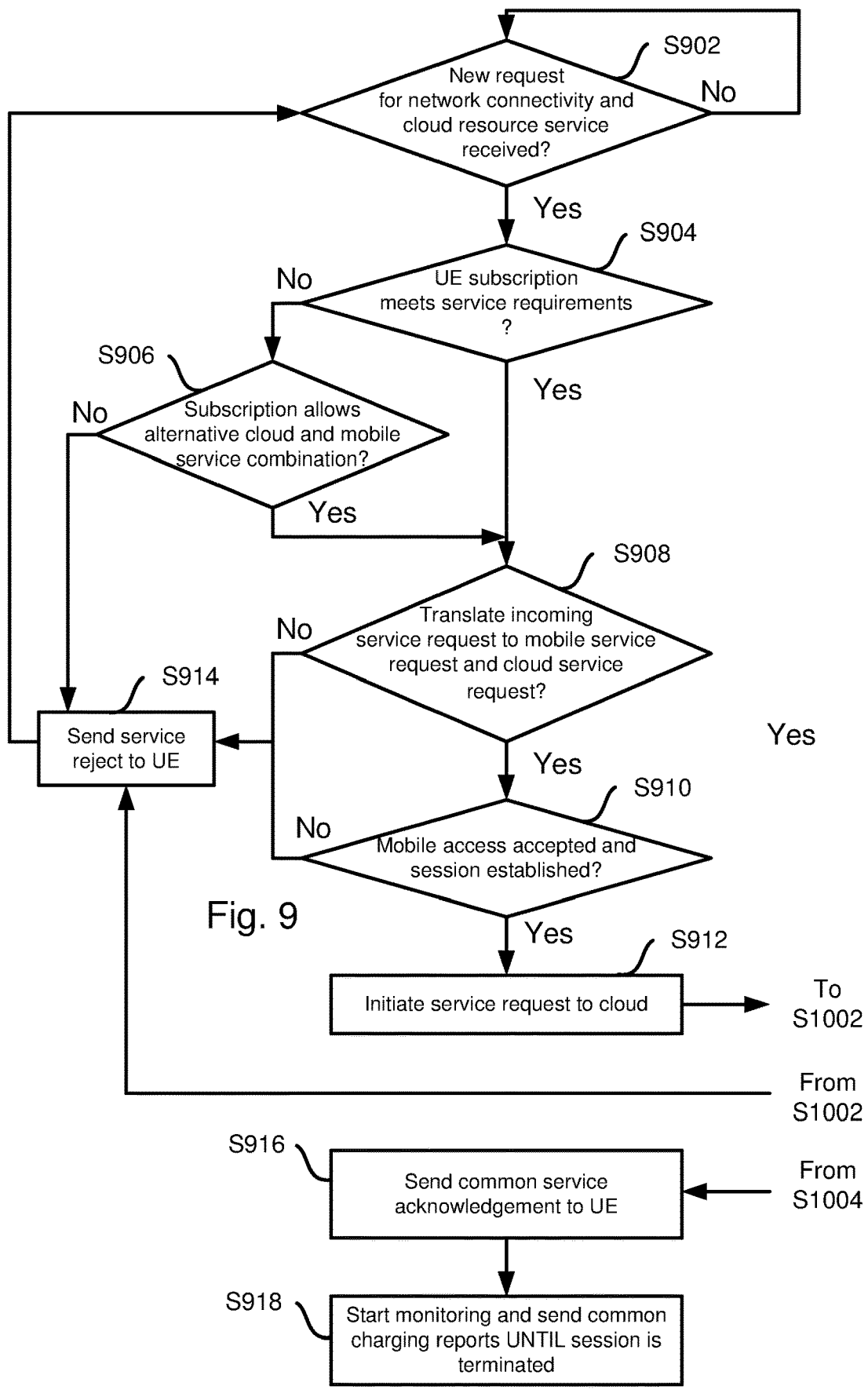
FIGS. 9 and 10 illustrate flowcharts of states within a communication system, according to the present disclosure.
Figure 10:
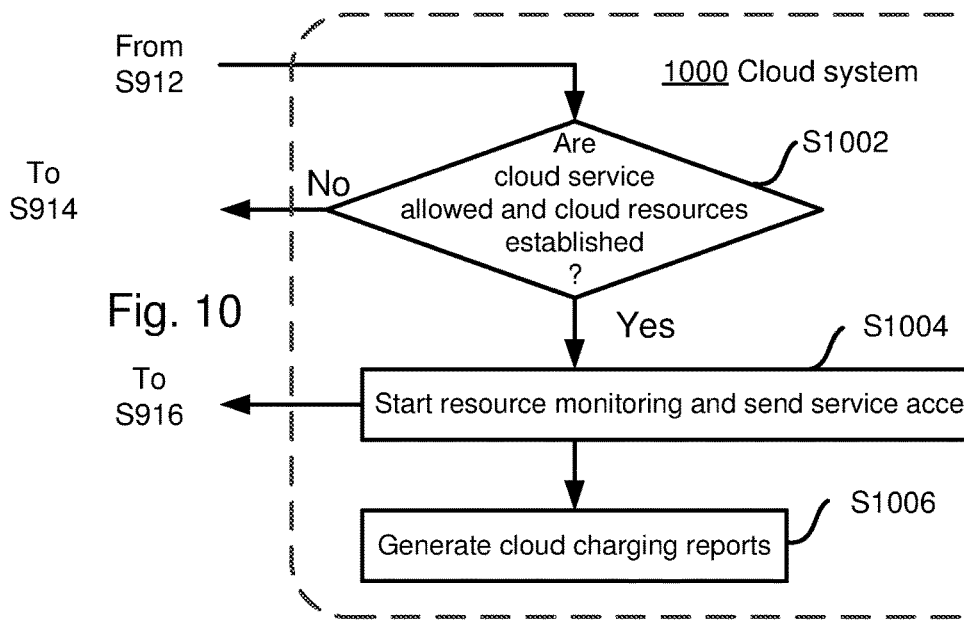

FIGS. 9 and 10 each present a state diagram during session establishment of a communication system, in form of a flowchart. The state diagram in FIG. 9 illustrates states for entities as comprised in the communication system.

State S902: In this state, it is determined whether a new request for network connectivity and cloud resource service has been received, or not. This state may be a state of the packet core system. If no new request for network connectivity and cloud resource service has been received, the determination may be periodically performed to check whether a new request for network connectivity and cloud resource service has been received. Thus, while no (NO) new request for network connectivity and cloud resource service has been received, the communication system remains in this state.

If (YES) a new request for network connectivity and cloud resource service has been received, the communication system enters next step.

State S904: In this state it is determined whether the UE subscription meets the service requirements. When the UE subscription meets the service requirement, the service request is translated into separated requests in the following state.

State S906: This state is entered when the UE subscription does not meet the service requirement. State S906 comprises to determine whether service subscription allows alternative cloud and mobile service combination.

State S908: This state is entered if either the UE subscription meets the service requirements, as determined in state S904, or if the subscription allows an alternative cloud and mobile service combination, as determined in state S906. State S908 comprises to determine whether an incoming service request can be translated to a mobile service request and a cloud service request.

State S910: The present state is entered when it is possible to translate the incoming service request to a mobile service request and a cloud service request. State S910 comprises to determine whether a mobile access is accepted and a session is established.

State S912: This state is entered when the mobile access was accepted and a session was established in state S910. State S912 comprises to initiate a service request to a cloud.

State S914: This state is entered if it was either not possible to transfer the incoming service request in state S908 to a mobile service request and a cloud service request, or when the mobile access was not accepted and a session could not be established in state S910. State 914 is state in which a service reject message is sent to the UE. This state, i.e. state 914 is also entered when the subscription does not allow an alternative cloud and mobile service combination, as determined in state S906.

Subsequent to state S914, state S902, as above, is entered.

Reference is now made to FIG. 10 comprising a portion of the diagram as referred to above. The states comprised in FIG. 10 may be considered to be states of a cloud system, for instance, of a cloud node.

State S1002: This is a state subsequent to state S912 of FIG. 9. State S1002 comprises to determine whether the cloud service is allowed and cloud resources may be established, or not.

State S1004: This state is entered if it was in state S1002 determined that the cloud service was allowed and cloud service was successfully established. State S1004 comprises to start resource monitoring and send a service accept.

State S1006: This state is entered subsequent to state S1004. State S1006 comprises generate cloud charging reports, until session is terminated.

In state S1002, when it was determined that the cloud service is not allowed and that cloud resources were not established, state S914 of FIG. 9 is entered. As mentioned above S914 comprises a state in which a service reject is sent to the UE.

Also, subsequent to state S1004, of FIG. 10, state S916 of FIG. 9 is entered.

Returning to the diagram of FIG. 9, state S916 comprises to send common service acknowledgement to the UE. Subsequent to state S916, is state S918, to start monitoring and send common charging reports UNTIL session is terminated.

Figure 11:
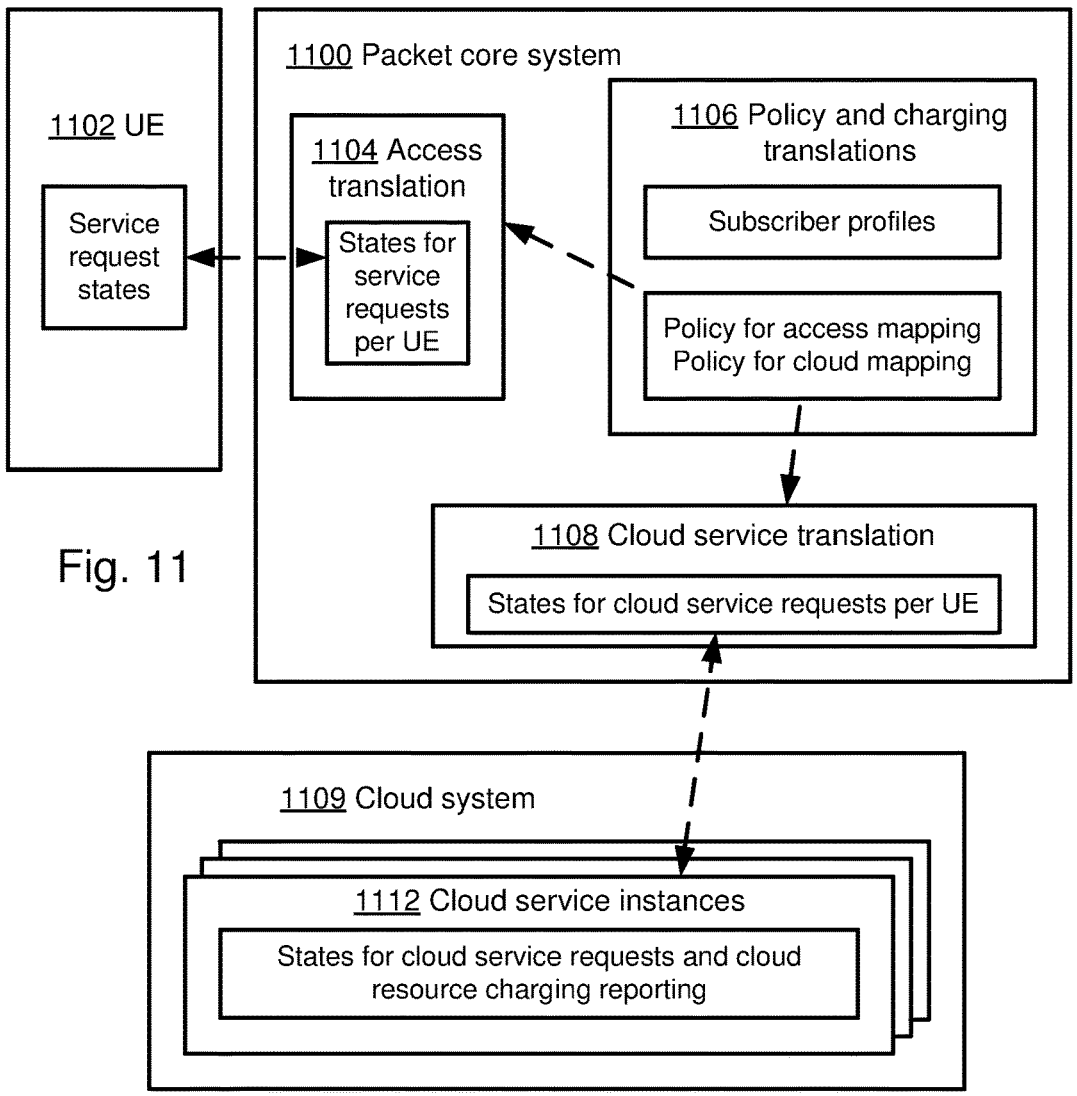
FIG. 11 schematically presents relations between translation functions and locations where states may be localized, according to the present disclosure.

FIG. 11 schematically presents relations between translation functions and locations where states, schematically presented in FIGS. 9 and 10, may be localized, according to the present disclosure. FIG. 11 also comprises entities of a communication system comprising a UE 1102, a packet core system 1100, and a cloud system 1109. The packet core system 1104 may comprise an access translation 1104, a policy and charging translations 1106 and a cloud service translation 1108.

Within the UE 1102, service request states are typically localized. Within the access translation 1104, states for service requests per UE, may be localized.

Moreover, subscriber profiles, provided that common access and cloud service is allowed, may be localized in the policy and charging translations 1106. Also, the policy and charging translations may also comprise a policy for access mapping, and a policy for cloud mapping.

Within the cloud service translation 1108 states for cloud service requests per UE may be localized.

Also, the cloud system 1109 typically comprises several cloud service instances. Within each cloud service instance, states for cloud service requests and cloud resource charging reporting, may be localized.

Service request state interaction may occur between the service request states within the UE 1102 and the ones as stored in the access translation, within the packet core system 1100.

Also, interaction between the access translation and the policy and charging translations typically occur, as policy, as above, may be fulfilled, for allowed services. Similarly, the policy for cloud mapping may be used in the cloud service translation, for which interaction typically also occurs between the cloud service translation and the policy and charging translations. Finally, interaction in the form of states of cloud service requests may also occur between the cloud service translation and the cloud service instances, all as indicated in FIG. 11.

Advantages of at least some of the embodiments as disclosed herein:

The present disclosure also provides an opportunity to flexibly change or update UE configurations of bearer setup parameters, based on what type of UE application service that is requested from the UE. The disclosure thus allows for a flexible change of bearer configurations so that requested connectivity in the mobile network fits requested end-user application services as provided by the operator in question.

It is further also an advantage that operators can offer common network access and cloud resource utilization services to its customers, with reduced cost for operation management of charging and billing.

ABBREVIATIONS

AMF access management function
CDF charging control function
DB database
EPG evolved packet gateway
DNS domain name server
FQDN fully qualified domain name
gNB 5G radio
ID identity
IP Internet protocol
HTTP hyper-text transfer protocol
NEF network exposure function
OCS on-line charging system
OFCS off-line charging system
OSS operations support systems
PCF policy control function
PDU packet data unit
QCI QoS class identifier
QoS quality of service
RAN radio access network
SMF session management function
UE user equipment
UDM universal data management
UDR user data repository
UPF user plane function

The invention claimed is:

1. A method for enabling common charging of network connectivity and cloud resource utilization for a user equipment (UE), wherein the method being performed in the UE, the method comprising:
   sending, to a packet core system, an attach request message;
   receiving, from the packet core system, one or more service definitions of common network connectivity and cloud service classes, as a consequence to said sending of the attach request message;
   sending, to the packet core system, a request for a network connectivity and cloud resource service, wherein a requested service is class-based, and wherein said request comprises one of said common network connectivity and cloud service classes; and
   receiving, from the packet core system, a response being an acceptance of the requested network connectivity and cloud resource service for enabling the packet core system to utilize common charging of network connectivity and cloud resource utilization.

2. The method according to claim 1, wherein receiving, of said one or more service definitions, comprises receiving service descriptors of each one of said common network connectivity and cloud service classes.

3. The method according to claim 2, wherein the service descriptors of each one of said common network connectivity and cloud service classes, represent unique combinations of resource parameters for network connectivity bandwidth and cloud service computing capacity.

4. The method according to claim 1, wherein receiving said one or more service definitions comprises receiving said one or more service definitions in a hyper-text transfer protocol security (HTTPS) request response from an Authorization server, or in a domain name server (DNS) reply from a DNS server.

5. The method according to claim 1, further comprising configuring the UE with the received one or more service definitions of common network connectivity and cloud service classes.

6. A user equipment (UE) enabling common charging of network connectivity and cloud resource utilization of said UE, the UE comprising:
  a processor; and
  a memory comprising instructions which, when executed by the processor, cause the UE to:
    send, to a packet core system, an attach request message;
    receive, from the packet core system, one or more service definitions of common network connectivity and cloud service classes, as a consequence to the sent attach request message;
    send to the packet core system, a request for a network connectivity and cloud resource service, wherein a requested service is class-based, and wherein said request comprises one of said common network connectivity and cloud service classes; and
    receive from the packet core system, a response being an acceptance of the requested common network connectivity and cloud resource service for enabling the packet core system to utilize common charging of network connectivity and cloud resource utilization.

7. The UE according to claim 6, further to receive service descriptors of each one of said common network connectivity and cloud service classes.

8. The UE according to claim 7, wherein the service descriptors of each one of said common network connectivity and cloud service classes, represent unique combinations of resource parameters for network connectivity bandwidth and cloud service computing capacity.

9. The UE according to claim 6, further to receive said one or more service definitions, from a server, in a hyper-text transfer protocol security (HTTPS) request response or in a domain name server (DNS) reply.

10. The UE according to claim 6, further to be configured with the received one or more service definitions of common network connectivity and cloud service classes.

11. A method for common charging of network connectivity and cloud resource utilization for a user equipment (UE), wherein the method being performed in a packet core system and the packet core system comprising a packet gateway, the method comprising:
  receiving, from the UE, an attach request message; and
  sending, to the UE, one or more service definitions of common network connectivity and cloud service classes, as a consequence to said receiving of the attach request message;
  wherein the method further comprises the packet gateway to perform operations comprising:
    receiving, from the UE, a request for a network connectivity and cloud resource service, wherein a requested service is class-based, and wherein said request comprises one of said common network connectivity and cloud service classes;
    translating the common network connectivity and cloud service class of the requested service into a first network connectivity class and a second cloud service class;
    sending, to a cloud node, a request for a cloud service, said request comprising the second cloud service class;
    receiving, from the cloud node, a charging event for cloud resources utilized according to the second cloud service class;
    merging the received charging event for cloud resources with a charging event of network connectivity according to the first network connectivity class, forming a merged charging event; and
    sending, to a charging node, the merged charging event for common charging of network connectivity and cloud resource utilization, according to the requested common network connectivity and cloud service class.

12. The method according to claim 11, wherein sending of said one or more service definitions, comprises sending, to the UE, service descriptors of each one of said common network connectivity and cloud service classes.

13. The method according to claim 12, wherein the service descriptors of each one of said common network connectivity and cloud service classes, represent unique combinations of resource parameters for network connectivity bandwidth and cloud service computing capacity.

14. The method according to claim 11, further comprising receiving, from the cloud node, a response to said request for the cloud service, wherein said response comprises an acceptance of said request, and wherein receiving the charging event comprises receiving a charging event for cloud resources according to the acceptance of the second cloud service class.

15. The method according to claim 11, further comprising receiving an acceptance of the requested network connectivity according to the first network connectivity class, from the cloud node.

16. A packet core system capable of common charging of network connectivity and cloud resource utilization for a user equipment (UE), wherein the packet core system comprising a packet gateway and the packet core system comprising:
  a processor; and
  a memory comprising instructions which, when executed by the processor, cause the packet core system to:
    receive, from the UE, an attach request message;
    send to the UE, one or more service definitions of common network connectivity and cloud service classes as a consequence to said receiving of the attach request message;
    wherein the packet gateway is to perform operations to:
      receive from the UE, a request for a network connectivity and cloud resource service, wherein a requested service is class-based, and wherein said request comprises one of said common network connectivity and cloud service classes;
      translate the common network connectivity and cloud service class of the requested service into a first network connectivity class and a second cloud service class;
      send to a cloud node, a request for a cloud service, the request comprising the second cloud service class;
      receive from the cloud node, a charging event for cloud resources utilized according to the second cloud service class;
      merge the received charging event for cloud resources with a charging event of network connectivity according to the first network connectivity class, to form a merged charging event; and send to a charging node, the merged charging event for common charging of network connectivity and cloud resource utilization, according to the requested common network connectivity and cloud service class.

17. The packet core system according to claim 16, further to send, to the UE, service descriptors of each one of said common network connectivity and cloud service classes.

18. The packet core system according to claim 17, wherein the service descriptors of each one of said common network connectivity and cloud service classes, represent unique combinations of resource parameters for network connectivity bandwidth and cloud service computing capacity.

19. The packet core system according to claim 16, wherein the packet gateway further is to receive, from the cloud node, a response to said request for the second cloud service class, wherein said response comprises an acceptance of said request, and further to receive a charging event for cloud resources according to the acceptance of the second cloud service class.

20. The packet core system according to claim 16, wherein the packet gateway further is to send, from a server, said one or more service definitions in a hyper-text transfer protocol security (HTTPS) request response, or in a domain name server (DNS) reply.

* * * * *